(12) United States Patent
Hu et al.

(10) Patent No.: US 12,449,609 B2
(45) Date of Patent: Oct. 21, 2025

(54) SEMICONDUCTOR STRUCTURE

(71) Applicant: FOCI FIBER OPTIC COMMUNICATIONS, INC., Hsinchu (TW)

(72) Inventors: Ting-Ta Hu, Hsinchu (TW); Po-Yi Wu, Hsinchu (TW); Chieh-Yu Fang, Hsinchu (TW); Ting-Yan Lin, Hsinchu (TW)

(73) Assignee: FOCI FIBER OPTIC COMMUNICATIONS, INC., Hsinchu (TW)

( * ) Notice: Subject to any disclaimer, the term of this patent is extended or adjusted under 35 U.S.C. 154(b) by 182 days.

(21) Appl. No.: 18/196,597

(22) Filed: May 12, 2023

(65) Prior Publication Data

US 2024/0337793 A1    Oct. 10, 2024

(30) Foreign Application Priority Data

Apr. 7, 2023    (TW) .................................. 112113152

(51) Int. Cl.
*G02B 6/36*    (2006.01)

(52) U.S. Cl.
CPC .................. *G02B 6/3684* (2013.01)

(58) Field of Classification Search
CPC .................................................... G02B 6/3684
See application file for complete search history.

(56) References Cited

U.S. PATENT DOCUMENTS

2011/0271774 A1* 11/2011 Nakamura ........... G01R 1/0408
  73/865.6

FOREIGN PATENT DOCUMENTS

| CN | 215867207 U | * | 2/2022 |
| JP | H06160660 A | * | 6/1994 |

OTHER PUBLICATIONS

English translation of CN'207 (Year: 2022).*
English translation of JP'660 (Year: 1994).*

* cited by examiner

*Primary Examiner* — Sung H Pak (57) ABSTRACT

The present invention provides a semiconductor structure including a substrate, a metal reflective layer, a UV glue layer, and an element. The metal reflective layer is placed on the surface of the substrate, and the UV glue layer is placed on the surface of the metal reflective layer. The element is manufactured by light-transparent material. The UV glue layer adheres the element to the metal reflective layer. By so, in the light-curing process, the curing of the UV glue is accelerated due to the metal reflective layer reflecting an ultraviolet ray.

7 Claims, 11 Drawing Sheets

SEMICONDUCTOR STRUCTURE

CROSS-REFERENCE TO RELATED APPLICATION

This application claims the priority of Taiwanese patent application No. 112113152, filed on Apr. 7, 2023, which is incorporated herewith by reference.

BACKGROUND OF THE INVENTION

1. Field of the Invention

The present invention relates to a semiconductor structure, and specifically relates to a semiconductor structure with improved UV glue curing speed through a metal reflective layer.

2. The Prior Arts

UV glue is widely used in semiconductor manufacturing processes to fix and protect elements. A well-known usage of UV glue is coating UV glue on the surface of an object and put the element to be fixed on the object. Through the radiation of an ultraviolet ray, the UV glue is cured from liquid state to solid state to fix the element on the surface of the object. The manufacturing efficiency of a semiconductor manufacturing process determines the number of manufactured products. The required time of UV-curing process associated with UV glue is generally unable to shorten, otherwise the adherence would not be secure and prone to produce defective products.

A fiber array unit (FAU) is a plurality of fibers arranged in a row or a plurality of rows fixed on a carrier. The FAU is then adhered on a silicon substrate or photonic integrated circuit (PIC) with UV glue. Such an FAU is generally made of light-transparent materials, such as silicon, glass, and so on. In view of this, the present invention seeks to use the light-transparent characteristic of FAUs to shorten the UV-curing time and increase manufacturing efficiency.

SUMMARY OF THE INVENTION

The main purpose of the present invention is to provide a semiconductor structure which mainly uses the principle that the curing of UV glue relies on the radiation of ultraviolet rays. A mirror surface is formed on the surface of the position to perform adherence with a metal reflective layer, which increases the ultraviolet ray absorbing efficiency of the UV glue, shortens the curing time of the UV glue, and increases the unit per hour (UPH) of semiconductor manufacturing, and further increases the manufacturing efficiency of semiconductors.

To achieve the purpose stated above, the present invention provides a semiconductor structure including a substrate, a metal reflective layer disposed on a surface of the substrate, UV glue disposed on a surface of the metal reflective layer, and an element manufactured by light-transparent material. The element is adhered to the metal reflective layer through the UV glue. By so, in a UV-curing process that radiates an ultraviolet ray, the metal reflective layer reflects the ultraviolet ray and accelerates the curing of the UV glue.

In an embodiment, the substrate is a chip.

In an embodiment, the substrate is a silicon substrate.

In an embodiment, the element is a fiber array unit.

In an embodiment, the fiber array unit is a plurality of fibers arranged in a row or a plurality of rows fixed on a carrier.

In an embodiment, the metal reflective layer has a plurality of holes, the UV glue adhering with the substrate through the holes.

In an embodiment, the metal reflective layer is a mirror surface.

The effect of the present invention is enabling the persistent reflection of the ultraviolet ray through the metal reflective layer disposed on the surface of the substrate, increasing the curing speed of the UV glue, and further increasing the manufacturing efficiency of semiconductors.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention and are incorporated in and constitute a part of this specification. The drawings illustrate embodiments of the invention and, together with the description, serve to explain the principles of the invention.

Figure 1:
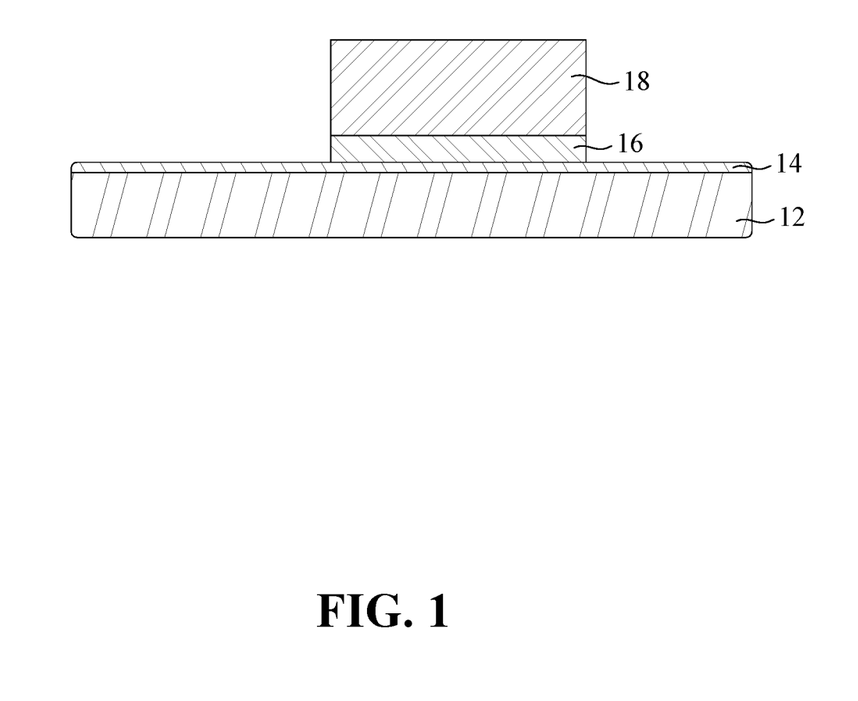
FIG. 1 is a schematic diagram of an embodiment of the present invention.

Please refer to FIG. 1, which is a diagram of an embodiment of the present invention. A surface of a substrate 12 is plated with a metal reflective layer 14, wherein the metal reflective layer 14 is a mirror surface capable of reflecting ultraviolet rays. Subsequently, on the surface of the metal reflective layer 14, UV glue 16 is applied to adhere an element 18 on top of the substrate 12 and the metal reflective layer 14. Using the feature that the element 18 is made of light-transparent material, an ultraviolet ray may penetrate the element 18 and is reflected from the metal reflective layer 14, thus shortening the curing time of the UV glue 16. In the present embodiment, the element 18 may be a fiber array unit (FAU). An FAU is a plurality of fibers arranged in a row or a plurality of rows fixed on a carrier, which is shown in the figure as a schematic diagram of a single section with the detailed structure of the fibers and carrier omitted. The substrate 12 allows the FAU to be fixed thereon, wherein the substrate 12 may be a chip, such as a photonic integrated circuit (PIC). In the case that the substrate 12 is a silicon substrate with circuits, the metal reflective layer 14 is to be used for reflecting the ultraviolet ray and may not have the function of metal wires. Apparently, the element 18 may be a light-transparent object of other types as well. As shown in FIG. 1, the area between the whole bottom surface of the element 18 and the metal reflective layer 14 is fully filled with the UV glue 16.

As a proof of the enablement of the present invention, FIGS. 2A to 2H provide a description of a manufacturing process of a semiconductor structure of the present invention. Please refer to FIG. 2A, to fix another element (such as a fiber array) on a silicon substrate 202 with adhesives such as UV glue, in the following manufacturing process, a metal reflective layer (such as copper, aluminum, Cu/Al alloy and/or a mirror surface doped with tungsten and/or titanium, and so on) is plated on the surface of the silicon substrate 202 to improve the curing speed of the UV glue. Such a plating process may be a redistribution layer (RDL)-bumping process, but the present invention is not limited thereto.

Figure 2A:
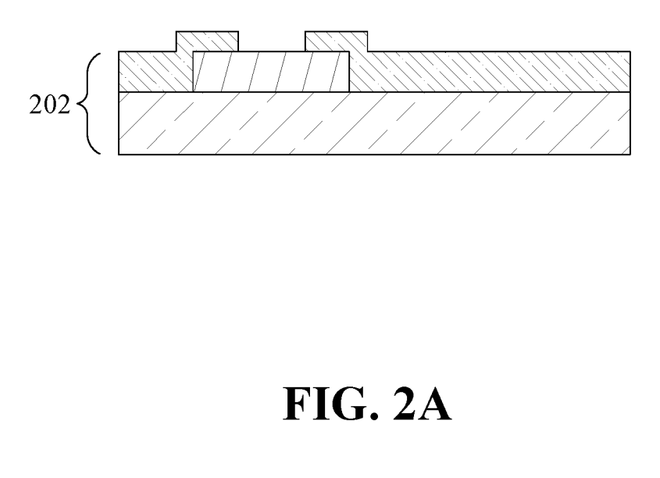
FIGS. 2A to 2H show the manufacturing process of a semiconductor structure disclosed in the present invention.
Figure 2B:
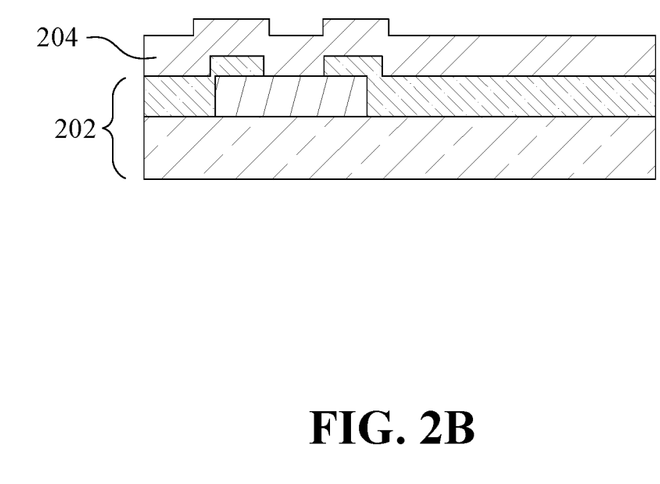

Please refer to FIG. 2B, first, sputter a first metal layer 204 on the surface of the silicon substrate 202 with an under-bump metallurgy (UBM) sputtering process as the conductive layer in the plating process and the seed layer allowing current to flow throughout the wafer evenly.

Figure 2C:
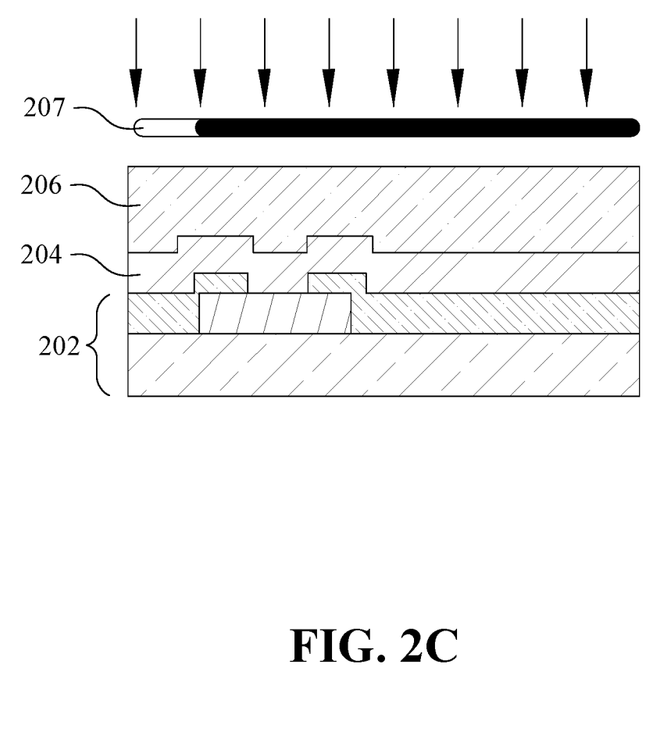

Please refer to FIG. 2C, subsequently, coat a photoresist layer 206 on the surface of the first metal layer 204 with a photoresist (PR) coating process, then place a mask 207 on top of the photoresist layer 206 and radiate an ultraviolet ray with a PR exposure process. The slit shape of the mask 207 is determined by process requirements.

Figure 2D:
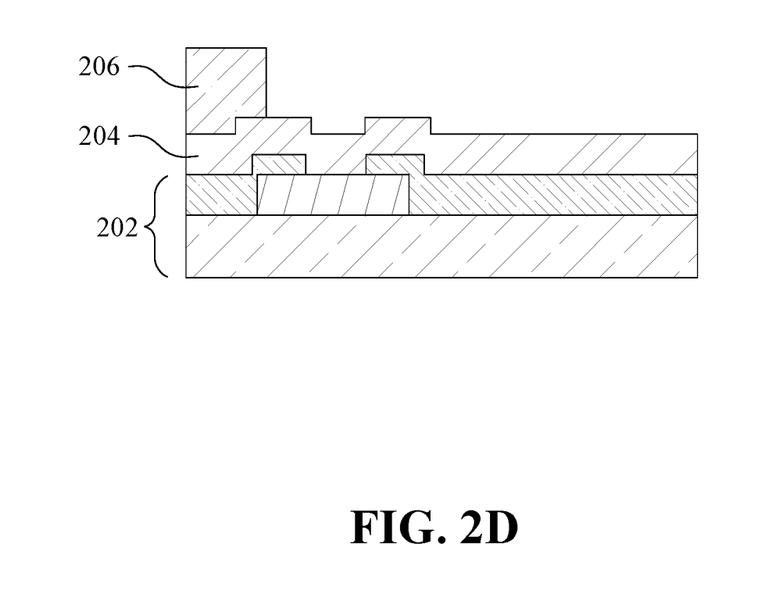

Please refer to FIG. 2D, subsequently, retain the desired part and remove the other part of the photoresist layer 206 with PR developing and PR curing processes. In the following step of plating the metal reflective layer, the part covered by the photoresist layer 206 will not be plated with the metal reflective layer, and the covering area and shape of the metal reflective layer is determined accordingly.

Figure 2E:
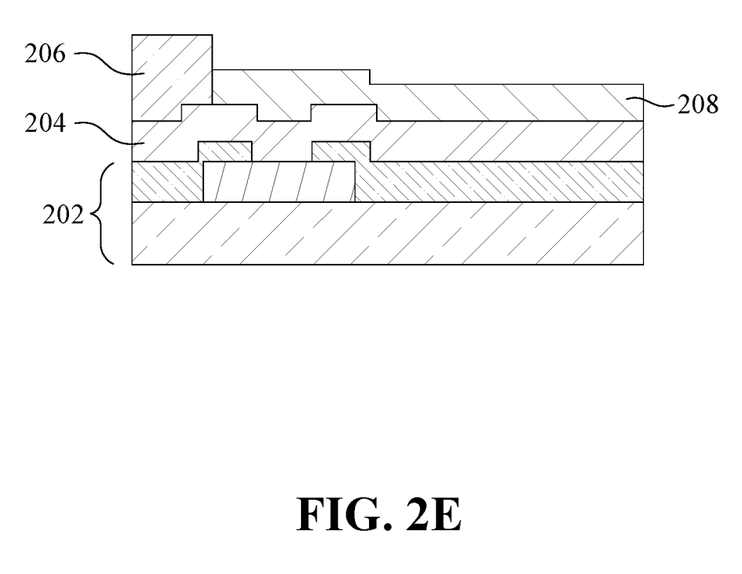

Please refer to FIG. 2E, subsequently, plate a metal reflective layer 208 in the area that is not covered with the photoresist layer 206 on the surface of the first metal layer 204 with a plating process. As described above, the metal reflective layer 208 may be copper, aluminum, Cu/Al alloy and/or a mirror surface doped with tungsten and/or titanium, and so on. The metal reflective layer 208 is a mirror surface.

Figure 2F:
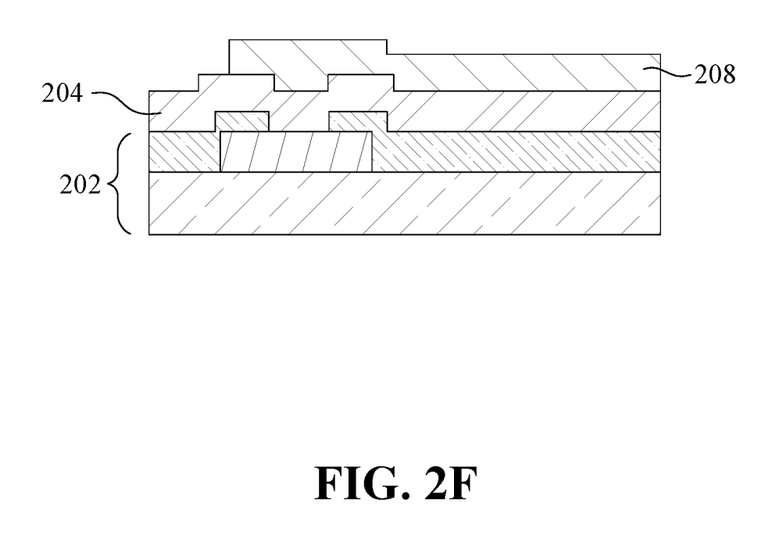

Please refer to FIG. 2F, subsequently, strip the photoresist layer 206 from the surface of the first metal layer 204 with a PR stripping process. Here, the metal reflective layer 208 covers the desired area while the other part of the first metal layer 204 is exposed and will be etched off in the next step.

Figure 2G:
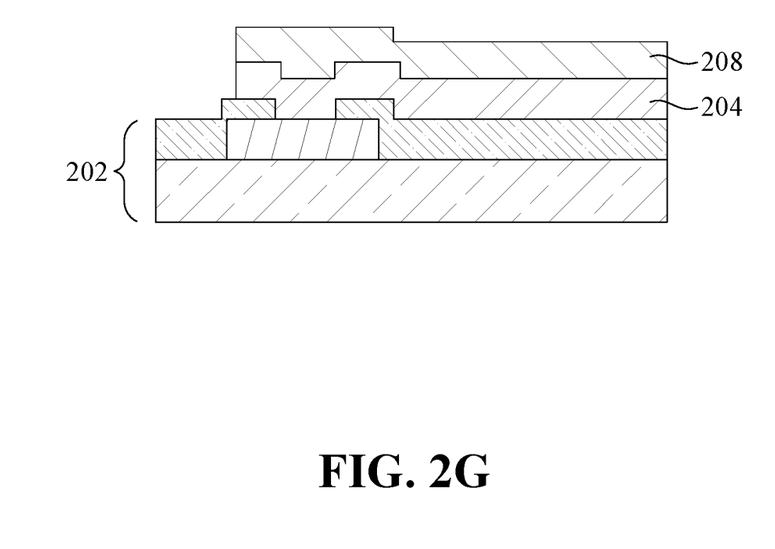

Please refer to FIG. 2G, subsequently, etch off the part of the first metal layer 204 not covered by the metal reflective layer 208 with a UBM etching process. Here, it is necessary to be careful with the etching state of the first metal layer 204. If the etching is not complete, an electrical short may occur; in the case of over-etching, an undercut may occur and impact the reliability of the electrical elements.

Figure 2H:
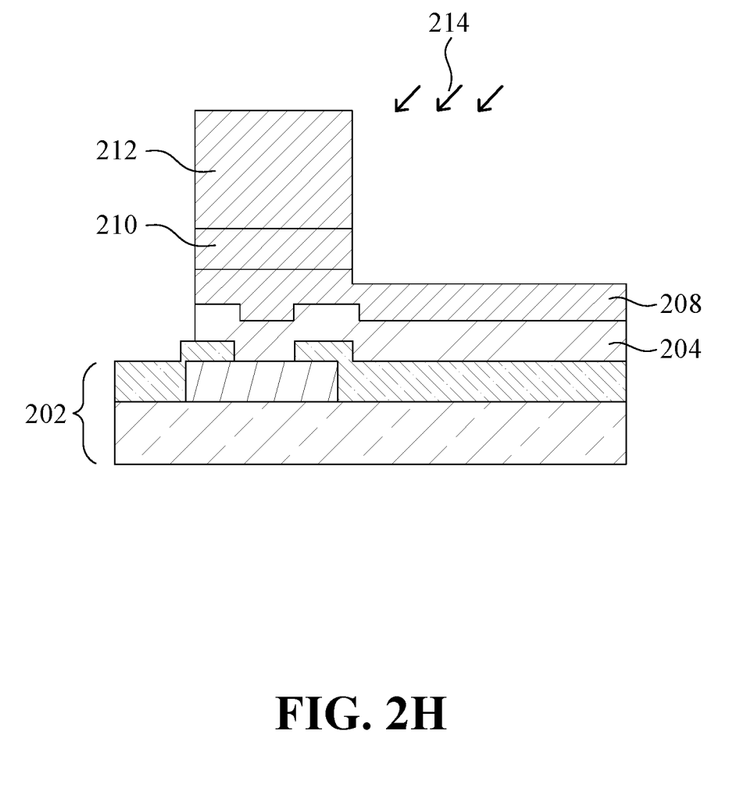

Please refer to FIG. 2H, finally, after the quality control of the product, UV glue may be applied on the metal reflective layer 208 on the surface of the product to adhere other elements. In the present embodiment, on the surface of the metal reflective layer 208, a UV glue layer 210 is applied to adhere an element 212. In the present embodiment, the element 212 is a fiber array. In the embodiment shown in FIG. 2H, the silicon substrate 202, the first metal layer 204, the metal reflective layer 208, the UV glue layer 210 and the element 212 are included, wherein the first metal layer 204 and the metal reflective layer 208 are disposed on the surface of the silicon substrate 202, and the UV glue layer 210 is disposed on the surface of the metal reflective layer 208. The element 212 is made of light-transparent material. The UV glue layer 210 adheres the metal reflective layer 208 and the element 212. By so, with the radiation of an ultraviolet ray 214 in a UV-curing process, the ultraviolet ray 214 is reflected from the metal reflective layer 208, which accelerates the curing of the UV glue layer 210.

To prove that the present invention may certainly shorten the curing time of the UV glue, the inventor has performed corresponding experiments. The ultraviolet ray used in the experiments has a wavelength of 365 nm and power of 6000 mJ/cm2. The ultraviolet ray is radiated in determined time durations, and then an external force is exerted at the adhering position. When the adhesion is loosened, check whether the thrust is greater than 500 g, which is the desired adhesive intensity. The experiment result is shown in the table below.

|  | Treatment group | Control group |
| --- | --- | --- |
| UV ray radiation time 70 sec | No | No |
| UV ray radiation time 80 sec | No | No |
| UV ray radiation time 90 sec | No | No |
| UV ray radiation time 100 sec | Yes | No |
| UV ray radiation time 110 sec |  | No |
| UV ray radiation time 120 sec |  | Yes |

Please refer to FIG. 1 again, which is the treatment group. In the embodiment, the element 18 is a fiber array unit, the fibers and carrier in the structure of the element 18 are made of light-transparent glass material, on the surface of the substrate 12 is the metal reflective layer 14, and the UV glue 16 adheres the element 18 on top of the metal reflective layer 14. It is known from the experimental result that the embodiment shown in FIG. 1 requires only 100 seconds to finish the curing of the UV glue 16.

Figure 3:
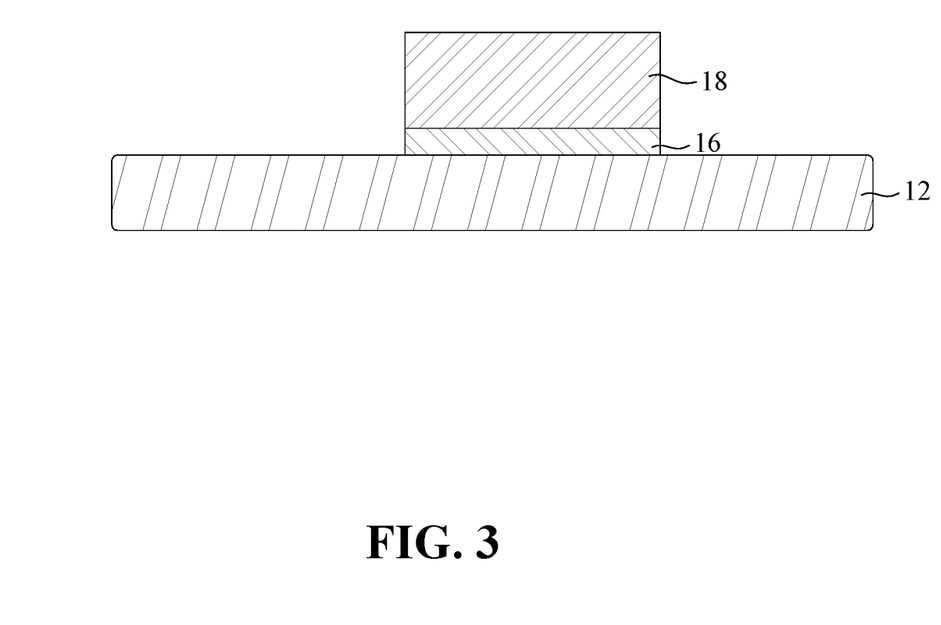
FIG. 3 is an experimental control group of the embodiment shown in FIG. 1.

Please refer to FIG. 3, which is the experimental control group of the embodiment shown in FIG. 1, the surface of the substrate 12 is not plated with a metal reflective layer and is thus regarded as a non-reflective surface. The UV glue 16 is directly applied on the surface of the substrate 12 to adhere the element 18 (which is a fiber array unit) on top of the substrate 12. It is known from the experimental result shown above that the control group shown in FIG. 3 requires 120 seconds to finish the curing of the UV glue 16. Hence, compared with the control group without a metal reflective layer shown in FIG. 3, the embodiment shown in FIG. 1 may significantly reduce the curing time of approximately ⅙, and thus increase the unit per hour of semiconductor manufacturing.

Figure 4:
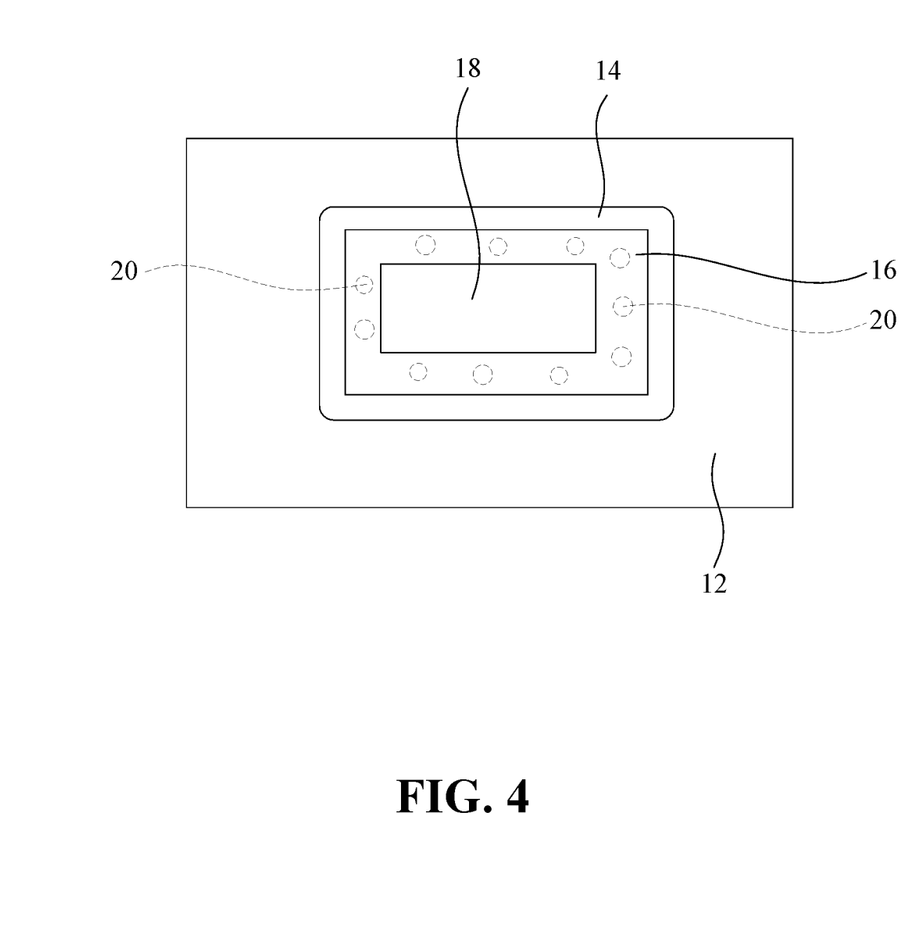
FIG. 4 is the top view of another embodiment of the present invention.

Please refer to FIG. 4, which is the schematic diagram of another embodiment of the present invention. In this embodiment, the coating area of the UV glue 16 is larger than the area of the element 18 covering the metal reflective layer 14. The metal reflective layer 14 has a plurality of holes 20 (shown in dashed lines). In addition to adhering with the element 18, the UV glue 16 also fills the holes 20 and directly contacts the surface of the undermost substrate 12. By so, after the curing of the UV glue 16, because of the common direct adherence to the substrate 12, the adhesive intensity between the metal reflective layer 14 and the element 18 may be strengthened.

Although the present invention has been described with reference to the preferred embodiments thereof, it is apparent to those skilled in the art that a variety of modifications and changes may be made without departing from the scope of the present invention which is intended to be defined by the appended claims.

What is claimed is:
1. A semiconductor structure, comprising:
a substrate;
a metal reflective layer, disposed on a surface of the substrate;
UV glue, disposed on a surface of the metal reflective layer; and an element, adhered to the metal reflective layer through the UV glue, the element being made of light-transparent material for passing an ultraviolet ray and an area between a whole bottom surface of the element and the metal reflective layer being fully filled with the UV glue;

wherein the UV glue is cured by the ultraviolet ray in a UV-curing process and the metal reflective layer reflects the ultraviolet ray that passes through the element to accelerate curing of the UV glue.

2. The semiconductor structure according to claim 1, wherein the substrate is a chip.

3. The semiconductor structure according to claim 1, wherein the substrate is a silicon substrate.

4. The semiconductor structure according to claim 1, wherein the element is a fiber array unit.

5. The semiconductor structure according to claim 4, wherein the fiber array unit is a plurality of fibers arranged in a row or a plurality of rows fixed on a carrier.

6. The semiconductor structure according to claim 1, wherein the metal reflective layer has a plurality of holes, the UV glue adhering with the substrate through the holes.

7. The semiconductor structure according to claim 1, wherein the metal reflective layer is a mirror surface.

* * * * *